United States Patent [19]

Schmider et al.

[11] 4,394,594

[45] Jul. 19, 1983

[54] MOTOR WITH A DISK ROTOR

[75] Inventors: Fritz Schmider, Hornberg; Rolf Müller, St. Georgen, both of Fed. Rep. of Germany

[73] Assignee: Papst-MOTOREN KG, St. Georgen, Fed. Rep. of Germany

[21] Appl. No.: 171,810

[22] Filed: Jul. 24, 1980

Related U.S. Application Data

[60] Continuation-in-part of Ser. No. 52,831, Jun. 28, 1979, abandoned, which is a division of Ser. No. 708,092, Jul. 23, 1976, Pat. No. 4,174,484.

[30] Foreign Application Priority Data

Aug. 23, 1979 [DE] Fed. Rep. of Germany ....... 2934183

[51] Int. Cl.³ ............................................. H02K 11/00
[52] U.S. Cl. .................................. 310/68 R; 310/156; 310/268; 318/254
[58] Field of Search ...................... 310/268, 68 R, 156, 310/113, 112, 90, 154; 318/254, 138

[56] References Cited

U.S. PATENT DOCUMENTS

| | | | |
|---|---|---|---|
| 2,296,754 | 9/1941 | Wolf et al. ...................... | 177/352 |
| 2,428,781 | 10/1947 | Bowlus ............................. | 310/268 |
| 2,890,438 | 6/1959 | Bardeen ........................... | 340/17 |
| 3,189,770 | 6/1965 | Henry-Baudot ................. | 310/156 |
| 3,324,321 | 6/1967 | Kober ............................... | 310/156 |
| 3,470,399 | 9/1969 | Johnson et al. . | |
| 3,482,131 | 12/1969 | Lytle ................................ | 310/268 |
| 3,845,339 | 10/1974 | Merkle et al. ................... | 310/68 X |
| 3,953,751 | 4/1976 | Merkle et al. ................... | 310/268 X |
| 4,007,390 | 2/1977 | Müller et al. .................... | 310/268 X |
| 4,174,484 | 11/1979 | Schnider ......................... | 310/268 X |

*Primary Examiner*—Donovan F. Duggan
*Attorney, Agent, or Firm*—Frishauf, Holtz, Goodman & Woodward

[57] ABSTRACT

Slow-running brushless d.c. motors with a disk rotor, a flat air gap and an iron-free stator winding made up of a number of coils are particularly suitable for direct drive of sound recording and reproducing equipment at a highly steady and controlled speed. The iron-free coils are arranged in a one-layer winding arrangement connected to form a plurality of phase windings, each comprising a pair of magnetically oppositely poled coils and rotor position sensing means, such as a Hall generator, are provided for controlling the currents in the phase winding so as to obtain four-current pulses per rotor rotation angle of 360 electrical degrees and to set up a rotary magnetic field driving the permanent magnet rotor. Two sets of coils are shown in the stator winding, each set comprising at least one pair electrically connected with each other and oppositely poled and spaced from each other by (2n+1)·180 electrical degrees, where n is a low positive integer. Double wound coils are shown with the two wires of the coils of a set being wound bifilarly and connected to form two-phase windings per set, with the width of the individual coils substantially greater than 180 electrical degrees. Embodiments illustrated show the disposition of coils and sensors for various cases in which the rotor has from three to seven pairs of poles.

31 Claims, 29 Drawing Figures

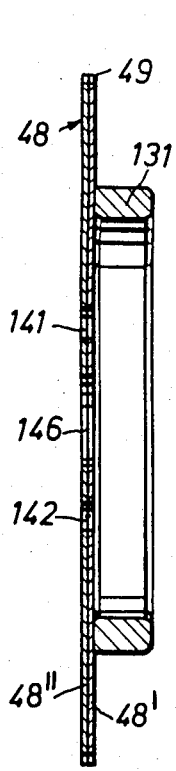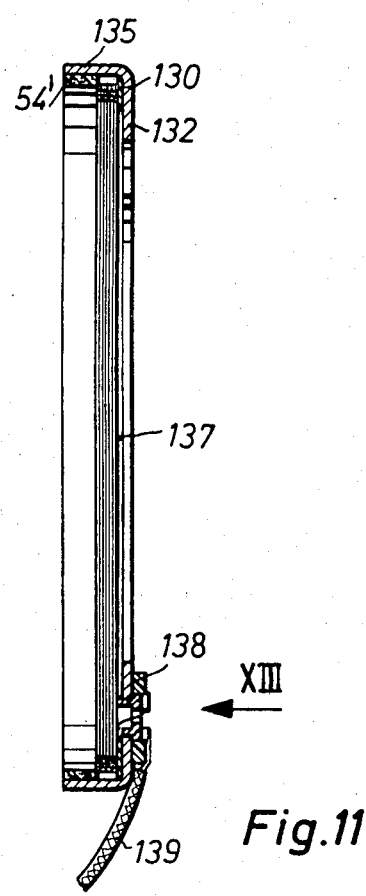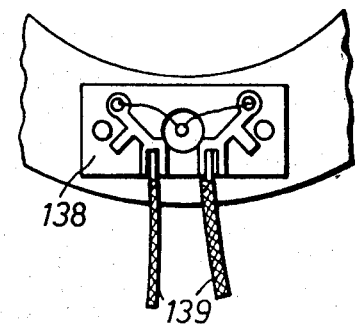
Fig.12
Fig.11
Fig.13

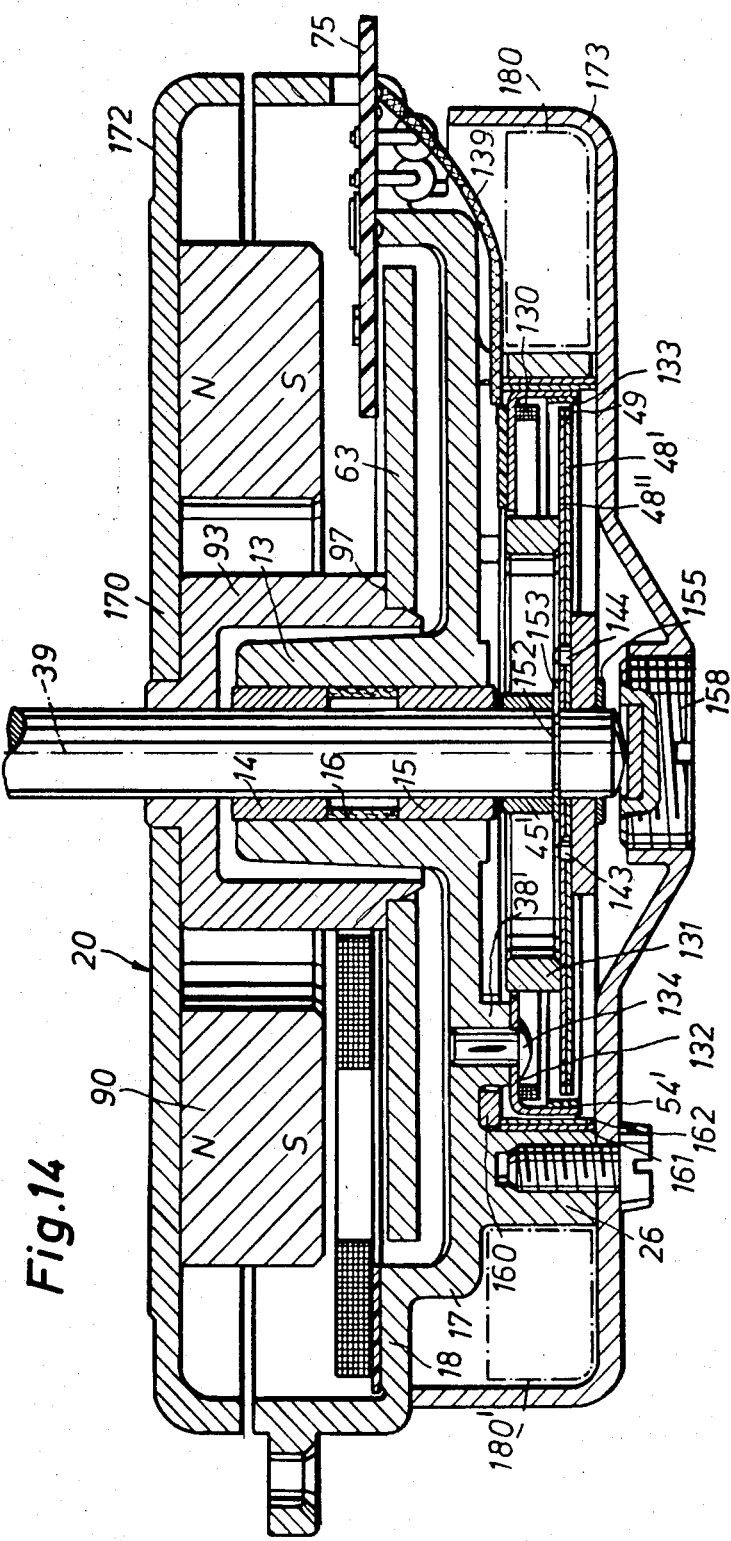

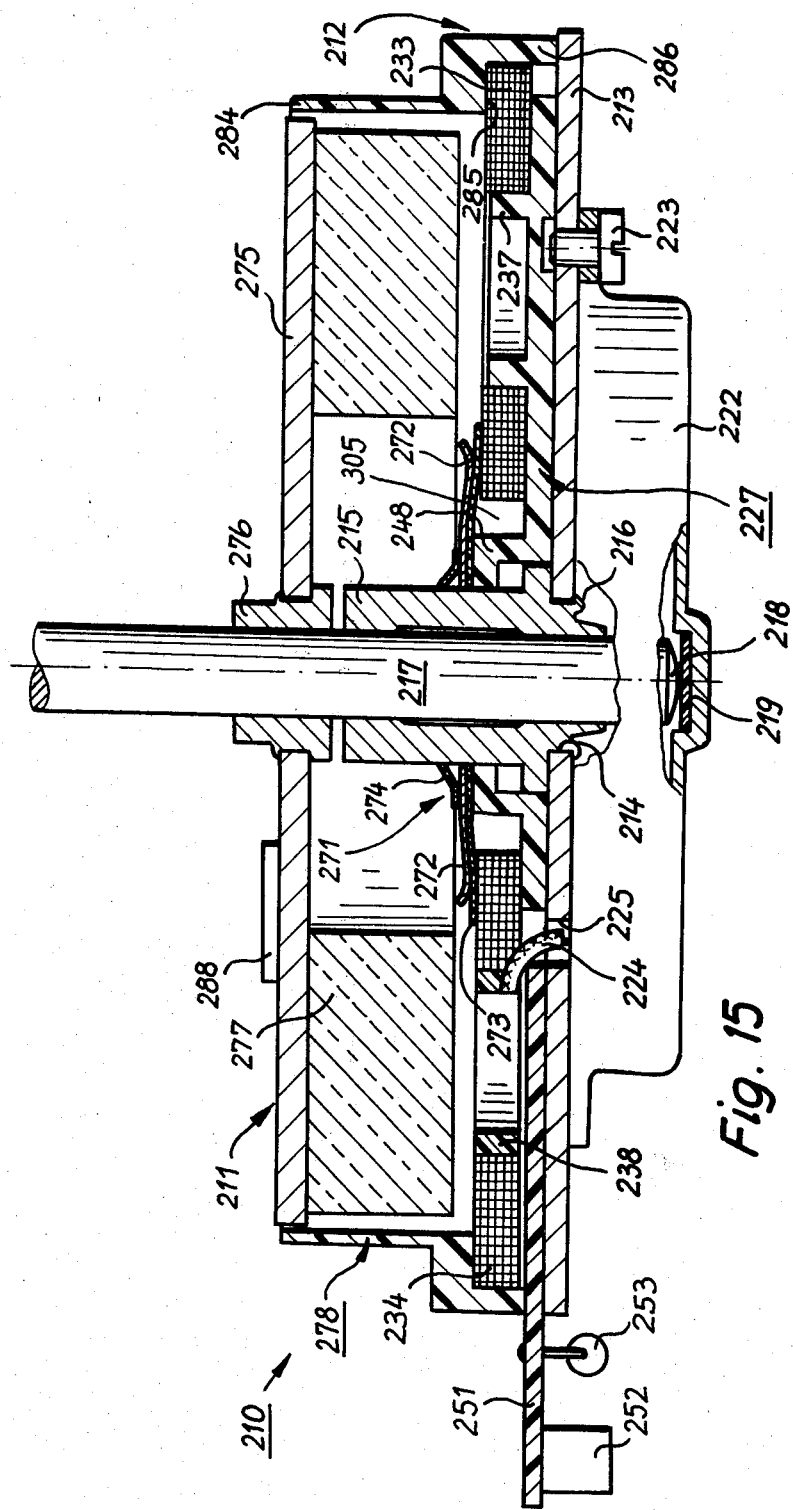

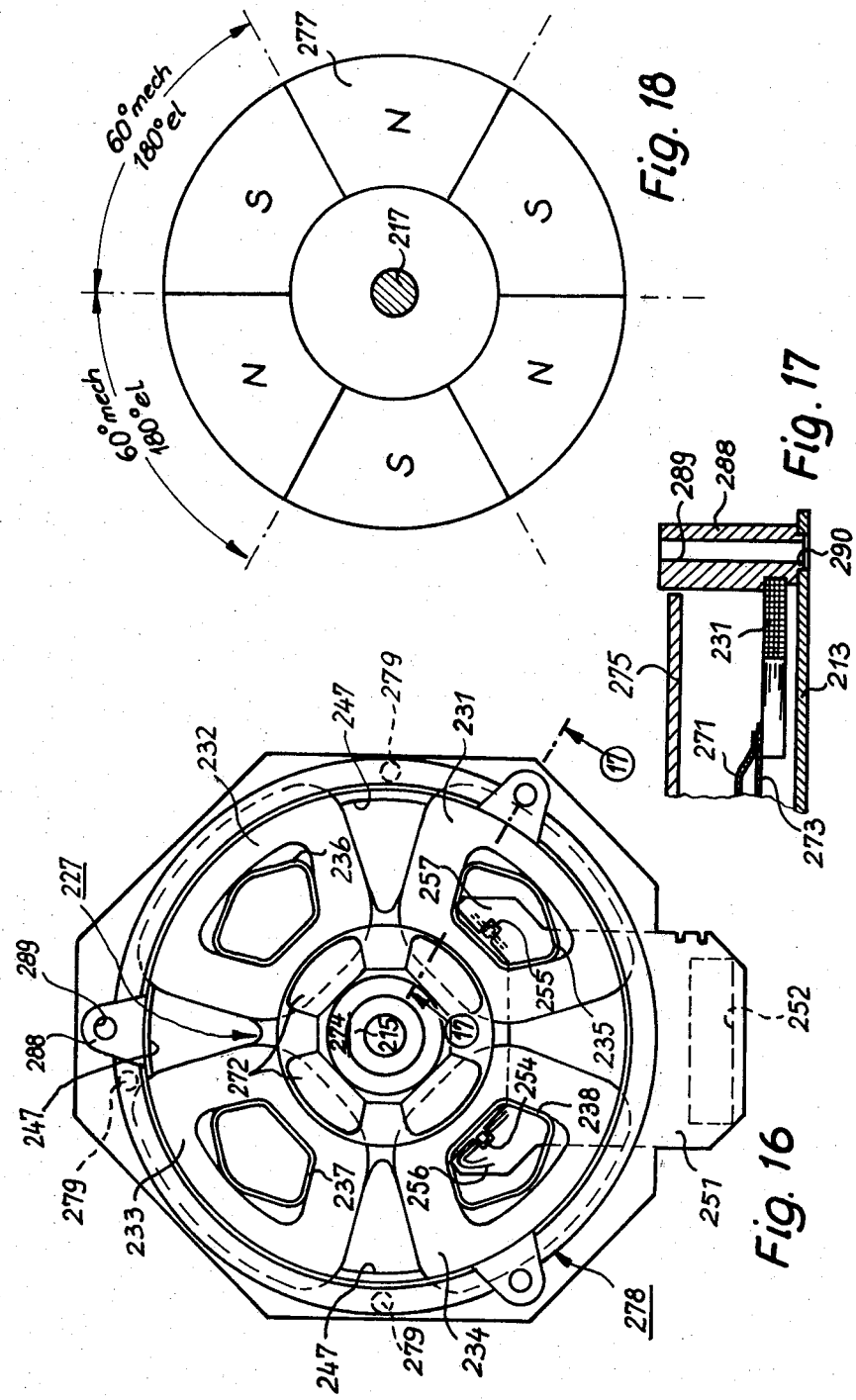

12 poles

MOTOR WITH A DISK ROTOR

This application is a continuation-in-part of application Ser. No. 52,831, filed June 28, 1979, now abandoned which is a division of application Ser. No. 708,092, filed July 23, 1976, on which U.S. Pat. No. 4,174,484 was issued.

The present invention relates to a motor with a disk rotor, and more particularly to such a motor which may be more simply fabricated which operates on the four pulse principle and may have practically any number of pairs of poles, usually between three and a dozen pairs for present day applications.

The present invention preferably relates to such a motor in whose flat air gap is provided an iron-free stator winding, typically a slowly rotating brushless direct current motor for directly driving recording and/or playback turntable. Reference is made to U.S. Pat. No. 4,125,792, issued Nov. 14, 1978, for a description of the general type of motor to which the present invention pertains.

Various constructions of disk rotor motors are known, i.e. motors having flat air gap. These known motors, however, require a relatively large manufacturing expenditure and effort.

SUMMARY OF THE INVENTION

Briefly, in one embodiment, the rotor is made of two parts held apart by a spacing piece located radially inward of the stator winding and mounted on the rotor shaft so as to receive the magnetic axial forces of the pole sectors or portions of the permanent magnet annular structure of the rotor located between the aforesaid two parts. The number of rotor poles may be referred to as 2p, where p is an integer and in practice is three or greater.

The motor is preferably constituted as a slow-running brushless d.c. motor and may have an extension below the bottom plate of the casing to enclose a speed measuring tachogenerator. The stator winding is iron-free and is made up of a number of coils. The iron-free coils are arranged in a one-layer winding arrangement, connected to form a plurality of phase windings, each comprising a pair of magnetically oppositely poled coils, and rotor position sensing means are provided for controlling the currents in the phase windings so as to obtain four current pulses per rotor rotation angle of 360 electrical degrees and to create in operation a rotary magnetic field driving the permanent magnet rotor. The stator winding preferably comprises two sets of coils, each set comprising at least one pair of coils electrically connected with each other and oppositely poled with respect to each other and spaced from each other by $(2n+1)\cdot 180$ electrical degrees, where n is a low positive integer.

Preferably, the coils are double-wound, the two wires of the coils of a set being connected to form two phase windings per set. The coil winding is preferably of bifilar type, i.e. the two wires run alongside each other. The width of the individual coils is preferably substantially greater than 180 electrical degrees.

Preferably, the first and third coils in circumferential sequence form a pair of one set of coils and are serially connected and oppositely wound and likewise the second and fourth coils forming the other set of coils are so connected and wound. The pattern may be repeated to provide eight (smaller) coils.

In one form of the invention, the winding arrangement comprises at least one set of four coils of which the first coils has the center-to-center distance of 270 electrical degrees from the second coil, the second coil has the center distance of 270 electrical degrees from the third coil, and the third coil has the center-to-center distance of 270 electrical degrees from the fourth coil.

Further features regarding the mounting of the rotor position sensors, the location of the speed control generator, and other matters, will be evident from the detailed description and from the various illustrative embodiments described in detail below and from the information given below regarding the disposition of coils and sensors for the various cases in which the rotor has from 3 to 7 pairs of poles.

The aforesaid illustrative embodiments and details of construction and principles of operation thereof are further and fully described below with reference to the annexed drawings, in which:

FIG. 10A is a longitudinal section view of a modification of the embodiment illustrated in FIG. 10;

FIGS. 11 and 12 are sectional views of individual parts of the embodiment of FIG. 10;

FIG. 13 is a face view of a terminal board also shown in FIG. 11, viewed from the direction of the arrow XIII in FIG. 11;

FIG. 14 is a longitudinal sectional view of a third embodiment of a motor according to the present invention, differing from the embodiment of FIG. 10 by a modification of the rotor;

FIG. 15 is a longitudinal sectional view of another illustrative embodiment of a motor according to the present invention;

FIG. 16 is a top view of the motor of FIG. 15, on a scale smaller than that of FIG. 15, omitting the showing of the entire rotor in order to illustrate the stator and casing of the motor;

FIG. 17 is a section in a radial plane passing through the stator coil 231 of FIG. 16 along the line XVII—XVII of FIG. 16;

FIG. 18 is a diagram showing the magnetization of the rotor in the motor of FIGS. 15 and 16;

Figure 1:
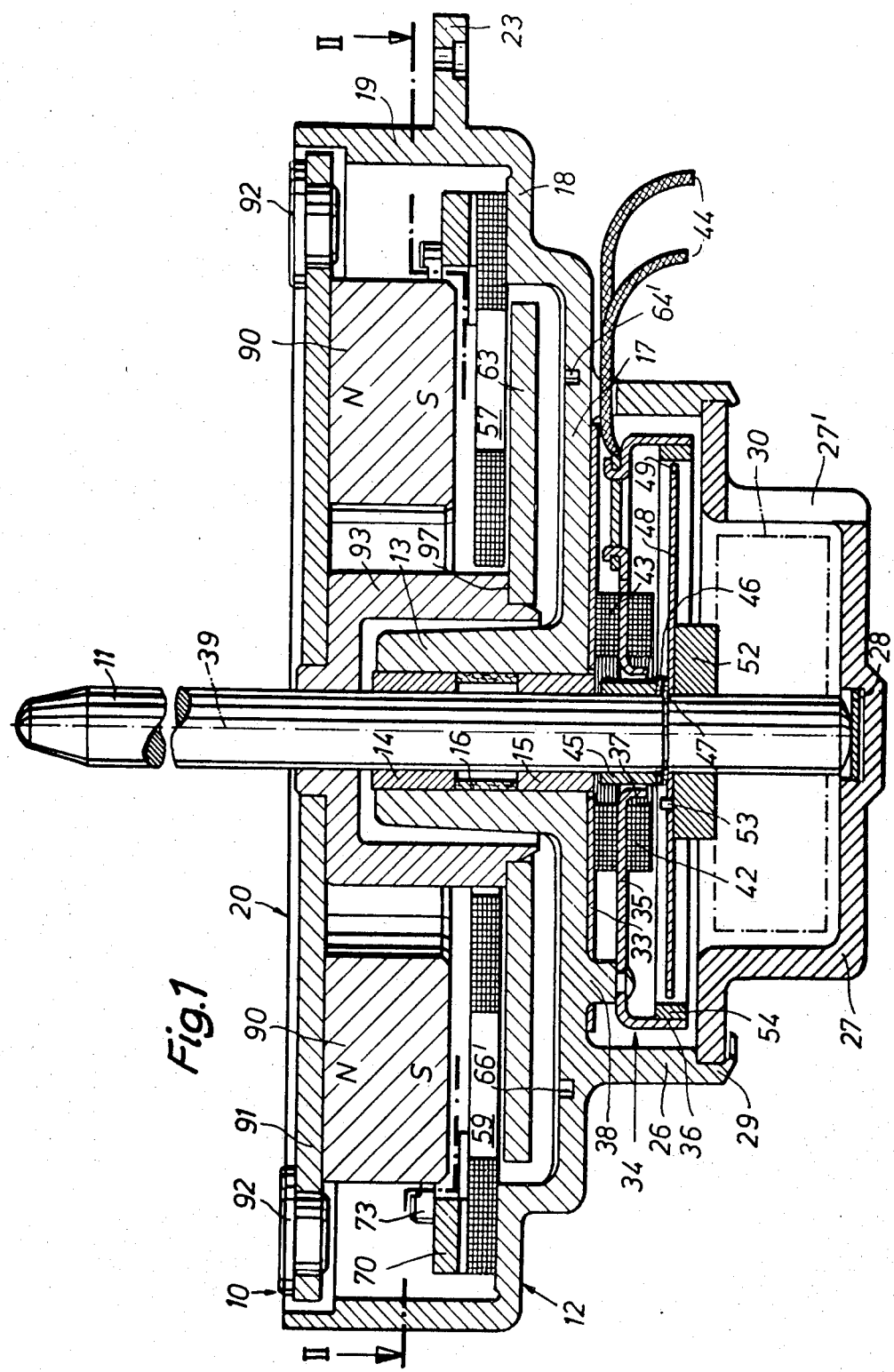
FIG. 1 is a longitudinal sectional view of a first embodiment of a motor according to the present invention.

FIGS. 24 to 28 further embodiments of the invention, in highly schematic form.

The scale of FIGS. 1, 10, 10A and 14, which show different constructions of a motor in which p is a multiple of four, and also of FIG. 15 illustrating a six pole motor (p=3), is approximately 2:1. The scale of FIG. 19, for example, is approximately 1:1. These statements of scale refer only to motors of a size now commonly used to drive a disk recorder or reproducer turntable and, furthermore, do not mean that the drawings are to scale within any particular degree of precision.

Identical and identically acting parts are given the same reference numerals or obviously related designations throughout the drawings.

DETAILED DESCRIPTION OF ILLUSTRATED EMBODIMENTS

FIG. 1 shows on a greatly enlarged scale an eight-pole brushless d.c. motor 10, which is constructed as a so-called disk rotor and is preferably used for the direct drive of record players. Motor shaft 11 is used for directly centering records on the not shown turntable which is mounted above the motor 10. Shaft 11 also passes through the motor longitudinal axis 39.

Motor 10 has a pan- or bowl-like die cast casing 12 (e.g. of zinc or aluminum) with an integral bush 13, in the inside of which are provided two sintered bearings 14 and 15. Between the bearings 14 and 15 is a felt washer 16 serving for the storage of oil. As shown, the sintered bearings 14 and 15 serve for the precise radial mounting of the shaft 11 relative to the casing 12.

At the bottom, the bush 13 integrally passes into a base plate 17 of casing 12 and on the outer periphery of the base plate 17 is formed a balcony-like elevation portion 18 which then passes into a casing edge 19 which extends upwards to above rotor 20. Three mounting eyes 23, 24 and 25 (best shown in FIG. 2) are provided externally on casing edge 19 and are preferably integral therewith.

At the bottom, the base plate 17 has an integral tubular extension 26 on whose lower edge is fixed a supporting member 27 for the lower axial bearing 28 of shaft 11. Supporting member 27 is secured to tubular extension 26 for example by bending over the lower edge 29 of member 26 or alternatively by screwing. The supporting member 27 is constructed as a deep drawn cup and serves to receive a part 30, shown only by dotted lines, e.g., a gear wheel or a cam, such as are regularly necessary for driving auxiliary devices on a record player. To the underside of base plate 17 is fixed a disk 33 made from soft magnetic material, e.g. of MU metal. Disk 33 serves to prevent leakage flux from the motor part to a tachogenerator designated generally by the reference numeral 34.

Tachogenerator 34 comprises a substantially trough-shaped part 35 made from soft magnetic material, whose outer edge 36 and inner edge 37 project downwards. Trough-shaped part 35 is fixed to projections 38 of casing base 17 and namely specifically centrally relative to the motor longitudinal axis 39. This central location of part 35 is advantageously achieved by means of a not shown centering tool inserted into the sintered bearing 15. Below part 35 is fixed a measuring coil 42 and above part 35 is fixed a bucking coil 43. Coils 42 and 43 are connected back to back, so that a leakage flux emanating from the motor part 35 passes through both coils and in both coils opposite voltages are induced which have the same value and cancel out one another, so that such a leakage flux does not influence the tachometer voltage. The two connections of the series-connected coils 42 and 43 are passed out of the casing 12 at 44.

Within the inner edge 37 of part 35 and radially spaced therefrom, a bush 45 made from soft magnetic material is fixed to shaft 11 and this serves as part of the magnetic return path of tachogenerator 34. Below bush 45 is located a bearing ring 46 and beneath the bearing ring 46 a lock washer 47 is fixed to the shaft 11. On washer 47 is mounted a soft magnetic disk 48, whose periphery carries a plurality of teeth, e.g. 200 teeth 49, which have a precisely identical pitch. The inner bore of disk 48 is precisely central relative to the outer edge of the disk and rests flush on shaft 11, so that the gap between the outer edge of disk 48 and the outer edge 36 of part 35 is virtually the same size at all points. Below disk 48 is provided a retaining and driving member 52, which is fixed to shaft 11 and which has a driver 53 for disk 48. Below member 52 is located gear wheel 30 for driving auxiliaries of the record player.

To the inner periphery of outer edge 36 of part 35 is fixed a radially magnetized magnet ring 54, which has 200 like poles (e.g. 200 south poles—the same number as the number of teeth of disk 48) distributed with the same spacing and juxtaposed over its inner periphery, i.e., it is magnetized in unipolar manner. The magnetic circuit of the magnet ring 54 is therefore closed via outer edge 36, base 35, inner edge 37, bush 45 and the disk 48. If in operation the disk 48 rotates with shaft 11, the magnetic flux flowing in this magnetic circuit fluctuates with a very high frequency. The said magnetic flux is interlinked with the measuring coil 42 and induces therein a relatively high frequency measuring voltage, but not in the bucking coil 43. Thus, a measuring voltage is obtained at conductors 44 which, due to the screening disk 33 and the bucking coil 43, is substantially free from stray voltages induced by the motor part.

Figure 2:
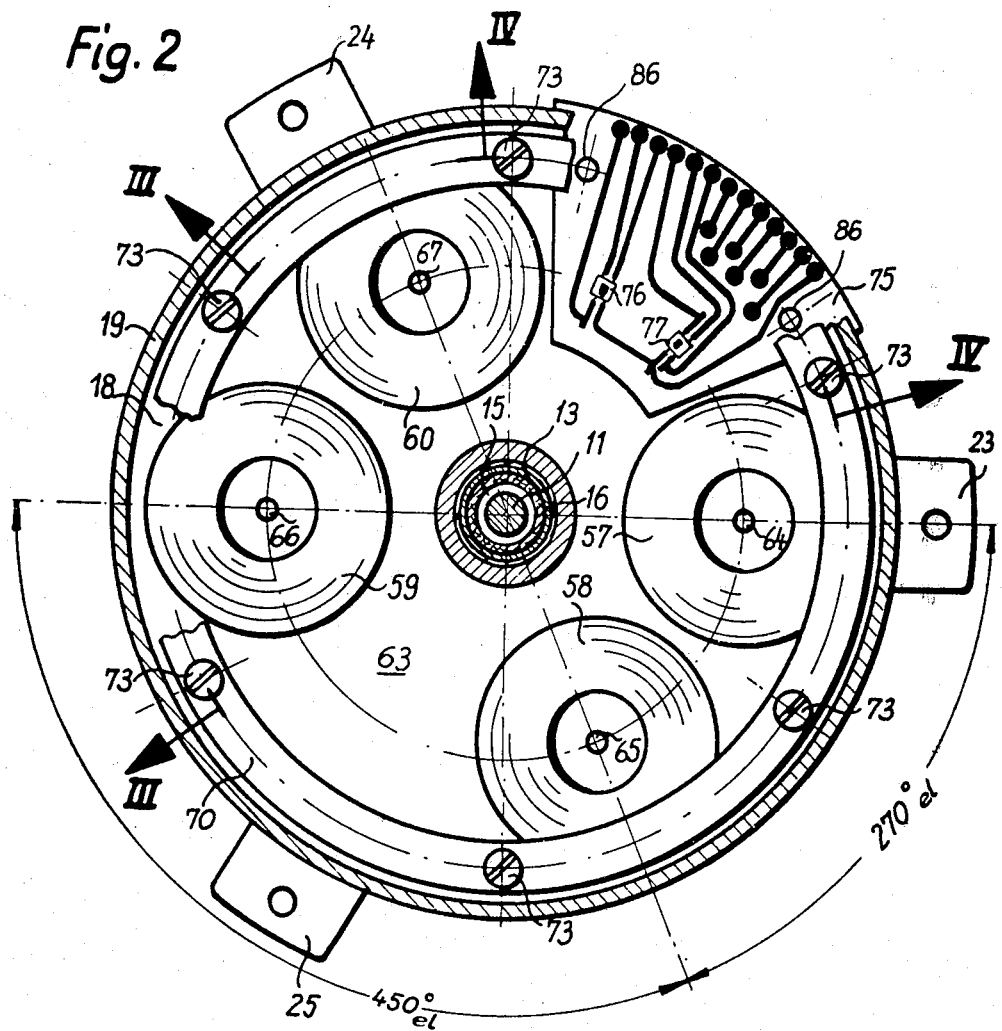
FIG. 2 is a cross-sectional view along the line II—II of FIG. 1.
Figure 3:
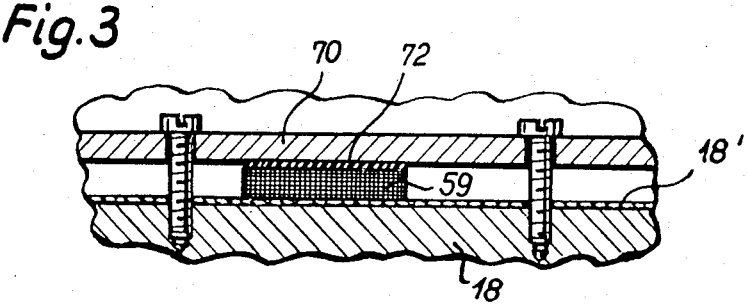
FIG. 3 is a detail, viewed along the line III—III of FIG. 2.

As shown in FIG. 2, four stator coils 57, 58, 59 and 60 constructed as circular coils, are arranged on the balcony-like elevation 18. The coils 57–60 are in each case wound in two-wire form and have the angular distances from one another given in FIG. 2. As shown, their diameter represents approximately 1.4 pole pitches. These coils 57–60 are so-called baked wire coils i.e., their wires are baked together and consequently form a very stable coil union, which can resist even high bending forces, particularly the not inconsiderable magnetic forces of rotor 20 occurring during assembly and disassembly.

Figure 5:
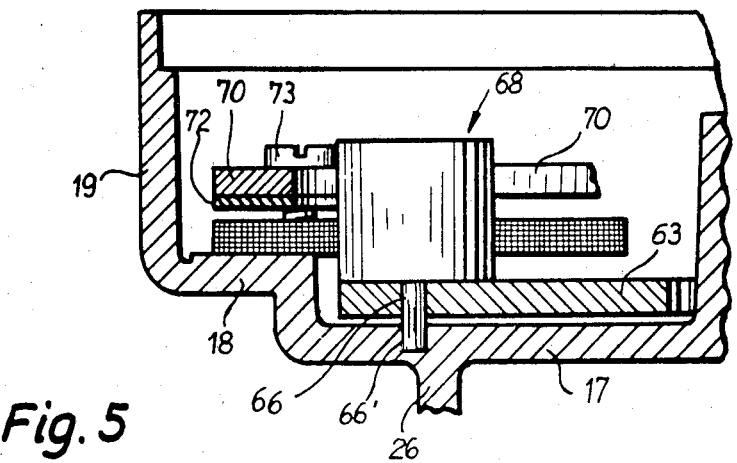
FIG. 5 is a view of the assembly of a coil and the assembly tool used for mounting the coil in the motor.

The rotor 20 has a lower soft iron return path disk 63, which rotates in operation. During coil assembly, this disk 63 is first placed on the casing base 17, as this disk 63 is first placed on the casing base 17, as shown in FIG. 5 and in such a way that the four assembly holes 64, 65, 66, 67 (FIG. 2) provided therein are aligned with corresponding assembly holes in casing base 17. FIG. 1 shows only two assembly holes 64' and 66' of the casing base 17. In accordance with FIG. 5, centering tools 68, whose outer diameter corresponds to the inner diameter of the coils, are inserted in all assembly holes. The four coils 57 to 60 are placed with their inner bores on respective centering tools 68 so that their positions in casing 12 is precisely defined. Then, in accordance with FIG. 2, a non-magnetic assembly ring 70 made from beryllium-copper is mounted on the outsides of the coils. Ring 70 has on its bottom four rubber supports 72, by means of which it presses on the respective outsides of the four coils 57-60. Ring 70 is fixed alongside the coils 57-60 by means of a total of six non-magnetic screws 73 as is pressed downwards against the coils, whereby it is elastically deformed and thus with elastic initial tension maintains the coils 57-60 on an insulating foil 18' on elevation 18.

Prior to the assembly of the coils, or subsequent to the same, if in place of a continuous ring 70 corresponding ring segments are used, a printed wiring board 75 is inserted through an opening in the casing edge 19. On the said board are arranged two Hall generators 76 and 77, resistors 114 and 115 (FIG. 9) associated therewith and four power transistors 82 to 85 for controlling the currents in the four coils 57 to 60.

Figure 4:
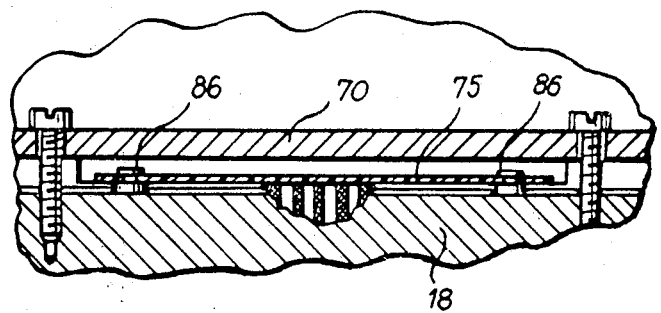
FIG. 4 is a detail, viewed along the line IV—IV of FIG. 2.

As shown in FIGS. 2 and 4, the printed wiring board 75 is riveted to the balcony-like elevation 18 with two rivets 86, so that the Hall generators 76 and 77 are positioned in the sector between the two coils 57 and 60.

The Hall generators are spaced from one another by 90° electric; Hall generator 77 has a spacing of 180° electric from the center of coil 57 and Hall generator 76 a spacing of 180° electric from the center of coil 60. Conductor plate 75 and the four coils are located in the same plane, namely the air gap plane of rotor 20.

After assembly of the coils and printed wiring board 75, the upper part of rotor 20 is mounted. The upper rotor part 20 has an axially magnetized magnet ring 90, which is magnetized with eight poles, whereof only two are shown in FIG. 1. Ring 90 is bonded or adhered to an iron support plate 91, on whose periphery are fixed five aluminum drivers 92, whose tops are somewhat higher than the casing edge 19. In its center, plate 91 is fixed to a bell-shaped spacer 93, which in turn is pressed onto shaft 11. For assembly purposes, shaft 11 is introduced into bush 13, whereat magnet 90 attracts the return path disk 63, so that as shown, the return path disk 63 engages with the lower edge of spacer 93, to which end disk 63 is appropriately guided from the outside through a corresponding opening in the casing. The bell-shaped spacer 93 then spacedly surrounds the bush 13 and can rotate about the bush 13. During assembly of the rotor, the four coils 57 to 60 take up the magnetic tension exerted by magnet 90, and the same effect happens on removing the upper part of the rotor 90, 91, 93, such as may be necessary for repair purposes.

After mounting the rotor 20, the bush 45, bearing disk 46 and lock washer 47 are fitted in place, followed by the disk 48 and member 52 and subsequently optionally gear wheel 30. The thickness of the necessary lower axial bearing disk 38 is then determined and subsequently member 27 together with the bearing disk 28 are fixed to the tubular attachment 26.

Coils 57 to 60 form four phase windings S1 to S4 (cf FIG. 9) and coil 57 is in fact connected in series in two wire form with coil 59 and the same occurs relative to coils 58 and 60. Therefore, coils 57 and 59, due to their two-wire winding, form two phase windings, and the same holds for coils 58 and 60. The associated coils are in each case connected in series in the same sense, i.e., if for example a current flow through one wire of windings 57 and 59, both generate for example, a south pole at the top and a north pole at the bottom thereof. In the symmetrical coil arrangement shown in FIG. 2, such arrangement is necessary, but this has the disadvantage that the leakage flux to tachogenerator 34 is relatively large.

Figure 9:
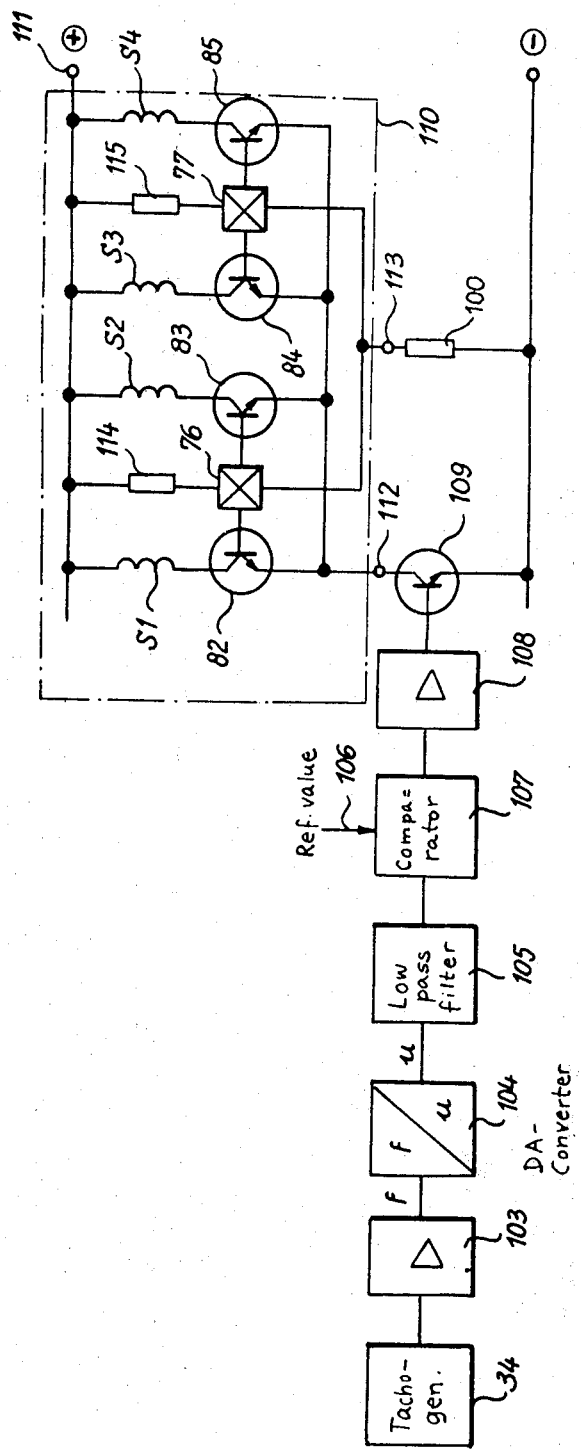
FIG. 9 is a schematic circuit diagram of a control arrangement for a motor according to the present invention.

FIG. 9 shows the construction of a control arrangement, such as is particularly well suited for use with a motor according to the invention. The output signal of tachogenerator 34 is amplified in an amplifier 103. The frequency f at the output of amplifier 103 is converted into a real value voltage u in a digital-to-analog converter 104. In a low pass filter 105, this real value u voltage is smoothed and is compared in a comparator 107 with a desired reference value supplied via a lead 106. The output signal of comparator 107 is amplified in an amplifier 108 and supplied to the input of a transistor 109, which controls the motor current in such a way that the motor speed is held very precisely at the desired value, e.g. 33⅓ revolutions per minute.

In FIG. 9, the parts arranged in motor 10 are surrounded by a dash-dotted line 110. It can be seen that the motor, except for the two connections of tachogenerator 34, only requires three additional connecting leads 111, 112 and 113, because resistors 114 and 115 are already arranged on the printed wiring board 75 mounted in the motor. This considerably simplifies assembly work and is therefore very advantageous. Terminal 113 is connected with the negative power lead via a resistor 100.

Figure 7:
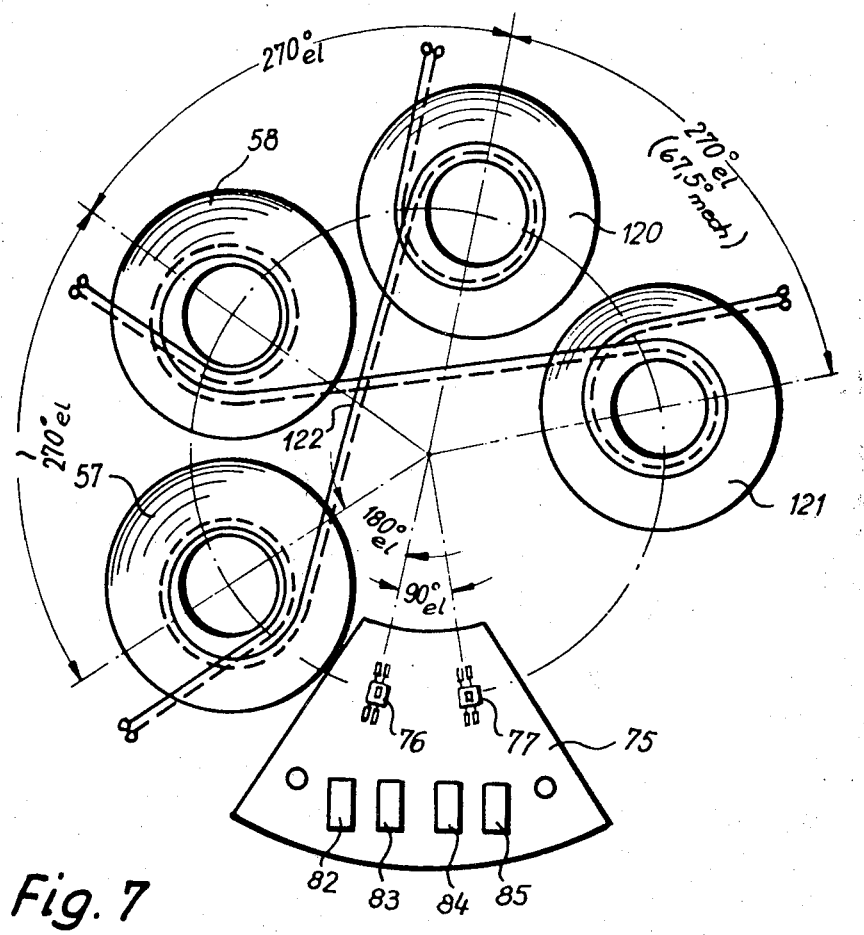
FIG. 7 is a preferred variant of the coil arrangement in an eight-pole brushless d.c. motor.

In order to reduce the leakage flux produced by the stator winding in the case of an eight-pole motor (or analogously with a motor having 16 or 24 poles), a coil arrangement according to FIG. 7 is particularly suitable. The printed wiring board 75 and coils 57 and 58 are arranged in the same manner as in FIGS. 1 and 2. However, the two other coils 120 and 121 are arranged directly following coils 57 and 58 in the direction of rotation. In each case there are 270° electric between coils 57 and 58, 58 and 120, and 120 and 121. In this arrangement of FIG. 7, coils 57 and 120 on the one hand, and 58 and 121 on the other are series connected, as shown, in bifilar and back-to-back manner. For example, if a current flows through the phase winding 122 (coils 57 and 120) the top of coil 57 becomes a south pole and the top of coil 120 becomes a north pole. Thus in each case unlike poles are produced so that the leakage flux to the tachogenerator 34 is very considerably reduced. Thus, in most cases the shielding plate 33 is completely adequate, making bucking coil 43 superfluous, which means a considerable simplification of the motor and also shortens the axial length of the motor.

Figure 8:
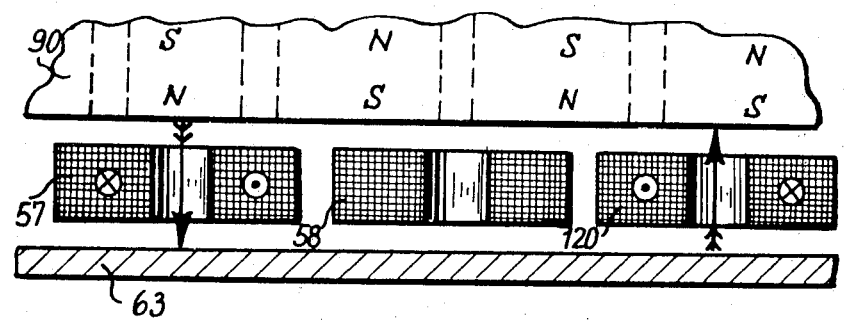
FIG. 8 is a partial schematic representation, in developed form, to illustrate operation of the arrangement of FIG. 7.

FIG. 8 schematically shows the action of the arrangement according to FIG. 7. In this case, coils 57, 58 and 120 are shown in a developed form between magnet ring 90 and the return path disk 63. It can be seen that the flux through coil 57 is in this case opposite to the flux through coil 120, connected in series with coil 57, and naturally the same applies in the case of coils 58 and 121. Therefore, the leakage flux is considerably reduced. In the case of good mounting, the asymmetry of the arrangement relative to the rotor axis does not have a detrimental action.

Figure 6:
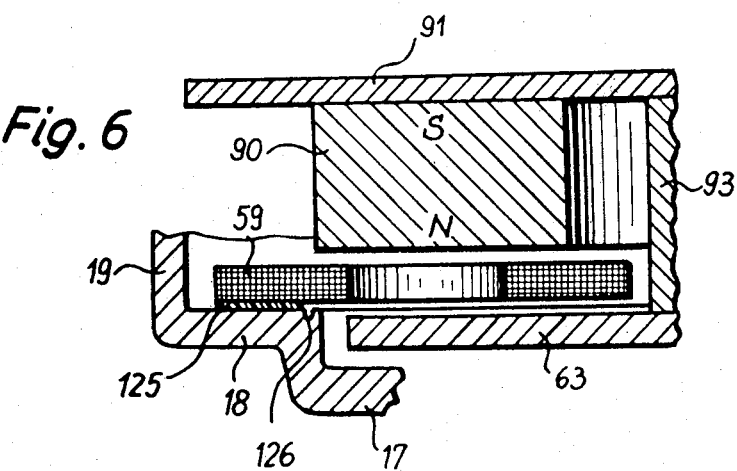
FIG. 6 is an alternative embodiment of the coil attachment by fixing the same to the stator casing for example with an adhesive.

FIG. 6 shows, for example on the coil 59, an alternative manner of attaching the coils. Between the coil 59 and the balcony-like elevation 18 is provided a non-woven fabric part 125, which is impregnated with a two-component adhesive e.g. an epoxy resin. In the manner described above, the coils are adjusted with the pins 68 according to FIG. 5 and then fixedly secured to the casing with a suitable tool and then heated to the hardening temperature of the adhesive. An annular slot or channel 126 prevents the melted adhesive from running down to base portion 17 where it might bond return path disk 63 to base portion 17.

When in the course of hardening the adhesive just mentioned, the adhesive material is warmed in a heating chamber, it becomes soft in the first phase of hardening and penetrates fully into the non-woven fabric part 125, so that the latter, after the hardening of the adhesive, forms a stiff bridge between the coil, e.g. the coil 59, and the balcony-like elevation 18. It has been found in practice that it is possible to fasten the coils most effectively in this fashion. In comparison to fastening of the kind shown in FIGS. 1 to 5, substantially fewer parts are needed. Furthermore, the electrical connections of the individual coils can be stuck fast to the balcony 18 in this adhesion process. These electrical connections are brought out to the plate 75 and there soldered to paths of the conducting pattern.

Figure 10:
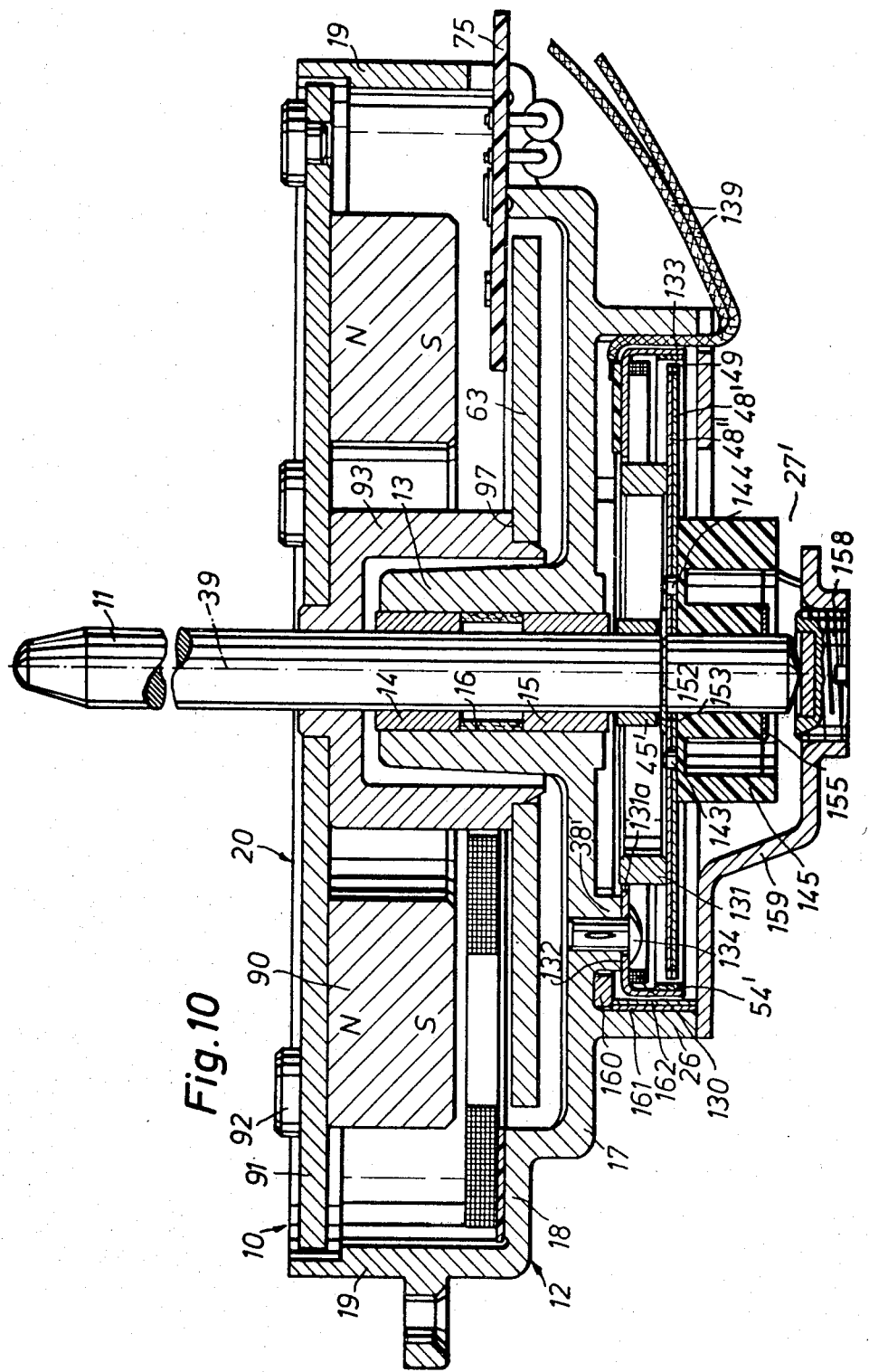
FIG. 10 is a longitudinal sectional view of a second embodiment of a motor according to the present invention.

FIG. 10 shows a different and preferred embodiment of the invention. The parts in FIG. 10 which have the same reference numerals that appear in the Figures described above have the same function as in the previous Figures and are accordingly not again described below. The same is true regarding these reference numerals in FIGS. 10A and 14 mentioned further below.

FIG. 10 shows, inside the tubular extension 26, a tachogenerator of a different construction that is still less sensitive to the penetration of external magnetic fields (whether these originate with the motor or from neighboring electronic apparatus). This is obtained in connection with the high tooth count (e.g. 200 teeth 49) of two superimposed toothed disks 48' and 48" of the same configuration, in such a way that the magnetic return path of a winding 130, which is located concentrically and farther out at the rim of the tachogenerator apparatus, is brought around closely over this winding, so that the flux from the teeth 49 of the toothed disk 48 reaches some distance further through this toothed disk 50 and thence into a ferromagnetic annular disk 131 of heavy cross-section rotating with it, after which it passes through an air gap 131a into the winding 130 which on both sides is closely approached by a surrounding sheet steel part 132 preferably made of soft ferromagnetic material, here shown as provided with a collar 135 and formed as a metal stamping. From the part 132 the flux proceeds to a heteropolar "rubber magnet" 54' magnetized, for example, with 200 north poles and 200 south poles, and from there again over an air gap 133 back to the toothed disk 48. Instead of the trough-shaped part 35 shown in FIG. 1, in this case the annular part 132 is provided with a large central cavity and is fastened to the motor casing 12 by stamped out projections 134. The stator of the tachogenerator, formed by the combination of the winding 130 and the "rubber magnet" 54' is extremely short and is particularly insensitive to external stray magnetic fields. This is a consequence of the fact that the useful flux variations in rotary operation of the toothed wheel 48 are large in comparison with the stray fluxes that might induce a disturbing voltage in the winding 130 through the shaft 11. This is again a consequence of the close envelopment of the winding 130 by the magnetic circuit, as well as the large spacing of this generally torus shaped arrangement from the ferromagnetic shaft 11.

In combination with the coil arrangement of FIG. 7 which is likewise advantageous with regard to external stray magnetic fields optimum conditions are thus obtained for the case in which an error in the output signal of the tachogenerator might produce a problem as the result of stray field effects. This result is obtained with a motor that is compressed axially as much as possible, having a total height of only a few centimeters, as is practically necessary for a direct drive motor for a turntable.

FIG. 10A shows a modification of the embodiment of FIG. 10, in which the bearing tube 13 is extended downward by an extension 13', so that, in comparison with FIG. 10, the ring 45' can be left out. Between the bearings 14 and 15', there is then a larger axial spacing, i.e. the shaft is better positioned. The disk 153 can turn directly alongside of one of the end faces of the bearing 15'.

FIG. 10A also shows a still further modification of the tachogenerator of FIG. 10. The stator core 132' is trough-shaped (annular trough). It is adhesively secured to the extension 38'. On its inner annular plane bottom surface, the annular winding 130 is attached by means of a synthetic plastic annular element coated on both sides with an adhesive.

Inside the outwardly projecting edge 135, there are arranged the rubber magnet 54', as well as the toothed rotor disk 48, as in FIG. 10. The inner edge of the trough-shaped stator core projects as for as an axial air gap 131b adjacent the rotating disk 48. In case a relatively large tolerance range is provided for axial adjustment, the air gap 131b is made correspondingly large for the difference.

For this reason, ferromagnetic return path ring 131' of about the same cross-section as in FIG. 10 (131) is provided, coaxial to the toothed disk 48, so that the flux returned in the magnetic circuit out of the trough-shaped sheet metal piece 132' can go through the radial air gap 131c to this back closure ring 131' and thence to the toothed disk 48 and ultimately the teeth 49 and so on (as in the other figures). With the ring 131' that is axially as thick as practically possible, and radially effective in a parallel plane, the return path resistance of the magnetic circuit of the tachogenerator can be practically independent of the adjustment position of the tachogenerator, because the radial tolerances in the air gap 131c (as also in the air gap 133) can be maintained accurate enough in mass production without particular difficulty. The air gap 131c can for this reason, furthermore, be much smaller than the axial air gap 131b, so that on account of the relatively large cross-section (in the flax direction), the ring 131 provides a much smaller and constant magnetic resistance.

Furthermore, the tachogenerator coil 130 is much more closely enveloped than in FIG. 10 even though the same toothed wheel and rubber magnet are present, which means a still further reduced possibility of stray flux.

Figure 11:
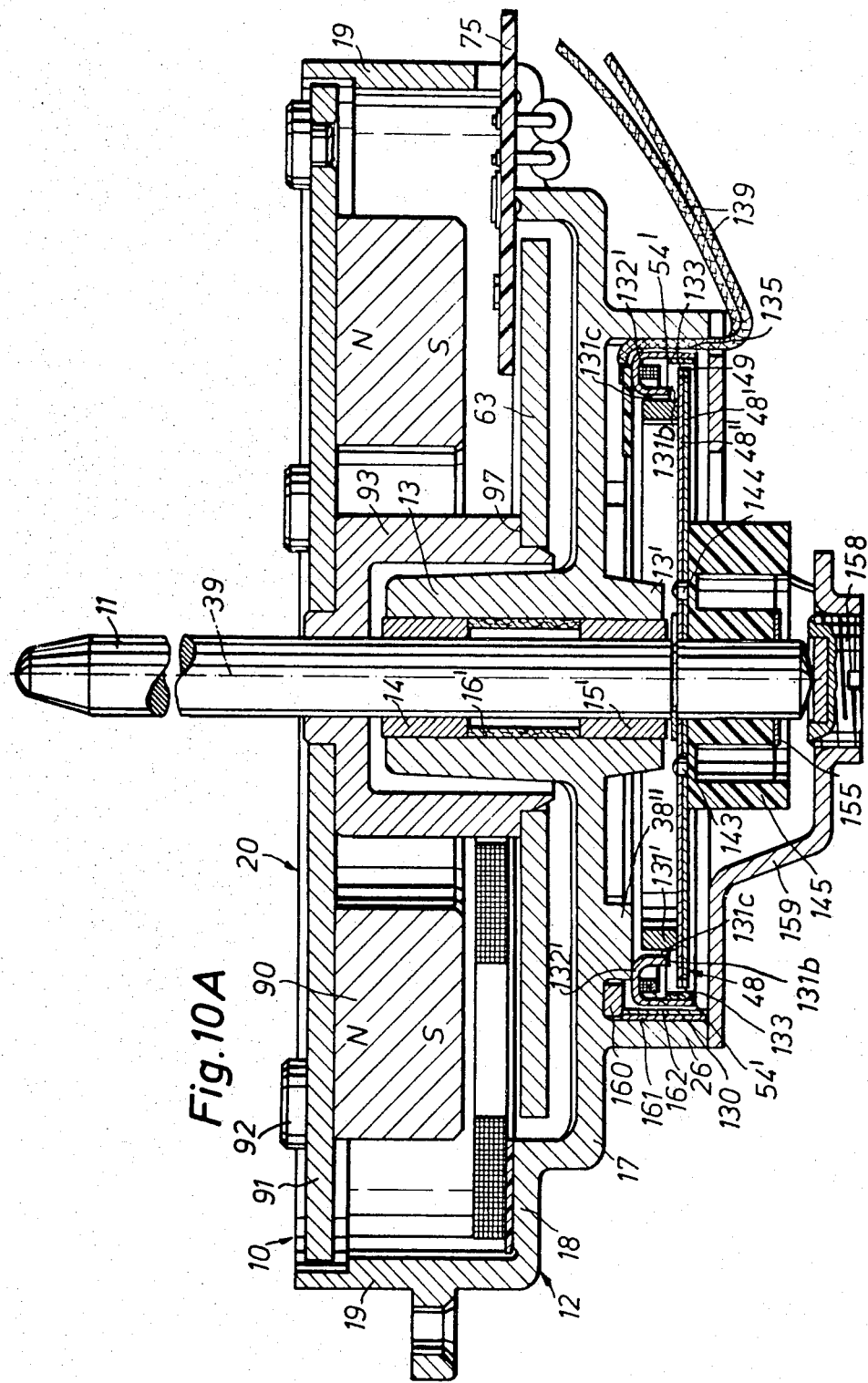

FIGS. 11, 12 and 13 show individual parts of the tachogenerator of FIG. 10. FIG. 11 shows the stator with the sheet metal stamping 132 in the collar of which there is affixed, with an adhesive, the magnetic strip or layer 54' (the "rubber magnet") of finely divided magnetic material held together in a synthetic binder, extending axially about half the height of the collar. After this magnetic strip is affixed with adhesive, its inner surface is bored or ground coaxial with the structure on a lathe or drill press, after which a foil 137 coated on both sides with adhesive layers is set on its flat inner surface in the ring 132 in order to provide for fastening the winding ring 130 and to insulate the latter against the metal part of the stator. The wire ends of the ring 130 are passed through a small plate 138 of synthetic material riveted to the part 132 and there soldered to the adjacent ends of two printed circuit conductor paths, from the other end of which a pair of braided wire leads 139 provides a connection to the speed regulator (not shown) of the motor.

FIG. 13 is a partial view of the unit of FIG. 11 in the direction and neighborhood of the arrow XIII of FIG. 11.

The disks 48' and 48" shown in FIG. 12 are stuck together with adhesive coaxially, tooth on tooth, together with the return path ring 131 as shown in FIG. 12 in an apparatus for providing the highest possible concentricity. The return path ring 131 is produced by a sintering process that makes possible highly accurate shape and dimensions for the body so produced, so that no further machining of it is necessary. Projecting studs 143 and 144 of a plastic part 145 extend into the openings 141 and 142 of the disks 48' and 48". The part 145 serves as a drive cam disk for an auxiliary mechanism that can extend through the opening 27' of the motor casing for powering connection with external elements of the apparatus to be driven, for example with a device for moving the pick-up arm of a record player. The central opening 146 of the disk 48 requires very narrow tolerances for concentricity of this disk relative to the shaft 11, whereas the studs 143 and 144 are so provided as to allow play in the openings 141 and 142, so that the studs merely carry the disk securely with them. On accound of the axial thickness and the fine division of the teeth 49, which may number 200 for example, for reaons of metal stamping technology two thinner identical parts 48' and 48" are used to form the disk 48. Increased concentricity and hence a canceling out of smaller eccentricity errors can be obtained if the second disk is rotated 180° relative to the first and then thus affixed to the first with adhesive. In this manner the output voltage of the tachogenerator 34 is made more even and regular, which is very important at low speeds.

The division of the toothed disk 48 into poles ("pole pitch") is preferably about 1/50 of its diameter, and the thickness of the ring magnet 54' is likewise about 1/50 of its diameter.

The tachogenerator stator part shown in FIG. 11 is riveted concentrically from the underside of the casing bottom 17 by means of the rivet-like parts 134, onto the projections 38' of the casing bottom.

After introduction of the rotor with its shaft 11 through the bearings 14 and 15, a spacing ring 45' is pushed onto the shaft 11. The face of the spacing ring 45' can slide on a slip bearing 15 and along a clamping disk 153 which is formed as a U-ring and clamped in a groove 152 of the shaft 11. When the faces of the ring 45 are fully adjacent to said neighboring parts, the return path part 63 of the rotor must not yet come into contact with the disk winding. This adjustment is made by means of a screw 158 which is screwed into a threaded bore of a deep drawn bottom plate 159.

The drive cam 145 made of synthetic material is pushed onto the shaft 11 after the emplacement of the rotor 20 so that it is seated with play, the studs 143 and 144 fitting into the openings 141 and 142 of the toothed disks 48' and 48" and abutting flush on the clamping disk 153. In this position a lower clamping ring 155 is then placed into position. Thereafter the bottom plate 159 is screwed fast to the rim 126 and then by means of the central axial bearing the rotor is adjusted into its axial position in the manner shown by the adjustable metal screw 158 that is coaxial with the shaft 11.

Since the magnetic strip 54' is axially at least twice as broad as the total thickness of the disks 48, the teeth 49 still remain in the field of the magnetic strip even for relatively large axial shift of the rotor by the screw 158, i.e. the tachogenerator 38 is insensitive to an axial shift of the shaft 11.

Two soft iron strips 161 and 162, which are fitted around the shell portion 132, i.e. mutually overlapping, and a flat stamping 160 of soft iron which in countour is somewhat horse-shoe shaped and lies between the shell part 132 and the motor, screen the tachogenerator 34 from stray magnetic fields and, surprisingly, also from such stray fields as may be produced by the electronic equipment located on the other side of the motor, for example from a power transformer or the like. As found in practice, this advantage holds for the power frequency range and up to 1,000 Hz.

FIG. 14 shows a modification in which the rotor part of the motor is differently constituted. In this case it is not contained in the rim 19 of the casing 12, but, as seen in the axial direction, closes it off flush. The upper cover disk is constituted as a shell like part 170 that has a donwardly turned ring shoulder 172. On the bottom part 18 of the casing there is seated a cup-shaped hub 173 extending downward, which as illustrated is screwed fast to the rim 26. The cup-shaped member 173 is closed and has a central disk 158 which is axially adjusted from below. The entire electronic equipment of the motor can be located in the region 180 below the cup-shaped member 173.

It will be understood that the motor of the present invention can in a similar way be equipped with another kind of tachogenerator, for example a tachogenerator operating optically. Similarly, other modifications and variations may be made within the scope of the inventive concept.

Figure 19:
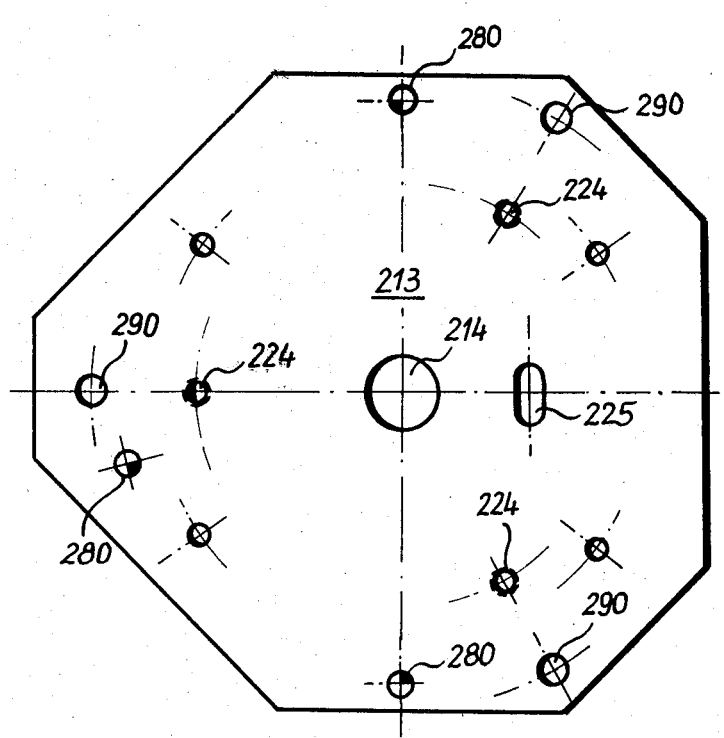
FIG. 19 is a plan view of the magnetic return path member of the motor.

FIG. 15 shows, as a further illustrative example of the invention, a section through a burshless d.c. motor 210 having a six-pole rotor 211 and a stator 12. An iron plate 213 serves both as a carrying member and as a stationary magnetic return path member and carries the stator. The iron plate 213 has the shape of an irregular octagon, as shown in FIG. 19 and in the description below is referred to as the return path member 213. About in its middle the return path member 213 has a hole 214 in which a bearing support tube 215 is crimped in place at 216, as shown in FIG. 15. The bearing support tube 215 serves to provide a seating and bearing for the rotor shaft 217. The latter is equipped at its lower end with a centering dome and rests on a plastic element 219 set in the middle of a bearing shell 222, which in turn is fastened to the magnetic return path member 23 by means of three screws 223 screwed into corresponding threaded bores 224 (FIG. 19). The bearing shell 222 can, if desired or needed for a particular application, mount a tachogenerator for speed control of the motor 210. For leading out the connection cable 224 of such a tachogenerator, an elongated opening 225 is provided in the return path member 213. The shaft 217 can, for example, serve for direct drive of a phonograph turntable.

For seating the four sector coils 231, 232, 233 and 234, a plastic molded piece 227 (FIG. 16) is provided having four projections 235, 236, 237 and 238 for the corresponding coil centers. In order to save weight, these projections have hollow centers. For further saving of weight, three triangular cutouts 247 are provided. The molded piece 227 has a somewhat raised collar 247 in the middle, which in the assembled condition surrounds the bearing support tube 215 and, at the same time, serves as a stop or backing for the means for pressing the coils in place when they are bonded with adhesive.

For controlling the currents in the four coils 231 to 234, sensors are required for determining the rotor position at the particular moment. Usually these are galvano magnetic sensors controlled by the magnetic field of the rotor magnet 277. These are disposed on a separate circuit board 251, which carries connector block 252, trimming resistors 253 and associated printed circuit connections. FIG. 16 shows that when two Hall generators 254 and 255 are used having a mechanical angular spacing of 90° and are located in the mid-plane of the coils 231 and 234 respectively, the circuit board 251 is provided with two extending side arms or ears 256 and 257, which have notches for respectively seating the two Hall generators 254, 255. The molded piece 227 is provided with a corresponding cutout for seating the circuit board 251, as shown in FIGS. 15 and 16. In assembly, the circuit board 251 is laid in this cutout and then the molded piece 227 is mounted on the return magnetic path member 213, after which the coils 231 to 234 are put in place and their connection leads connected together in the ring channel or groove 305 (FIG. 15) and connected to the circuit paths of the circuit board 251.

The coils 231 to 234 are best fixed in place by a small amount of quick-hardening adhesive applied to the molded piece 227. For pressing the coils against the molded piece 227, a pressing device in the form of a spring disk or spider 271 is provided having four spring-pressure arms 272, one for each coil. Between the arms 272 and the coils is an insulating disk 273 which also covers the ring channel 305. The spring disk 271 is centered on the bearing support tube 215. A self-locking serrated ring 274 is pushed downwards over the bearing support tube 215 in order to press the center of the spring disk 271 against the collar 248.

The rotor 211 has a flat carrier disk 275 made of steel which is affixed to the shaft 217 by means of a bushing 276. On the underside of the disk 275 is firmly affixed with adhesive an axially magnetized ceramic permanent magnet ring 277. Its magnetization is shown in FIG. 18.

Located closely around the outside of the permanent magnet 277 is a stationary annular part 278 made of glass fiber reinforced polyamide that has three studs 279 on its underside that extend through the holes 280 of the return magnetic path member 213 and are deformed ultrasonically into rivet heads that hold the annular part 278 securely in place.

The annular member 278 has a thin cylindrical portion 284 which at its lower end goes over by transition through an annular shoulder 285 into a cylindrical portion 286 of larger diameter. The annular shoulder or step 285 serves to press against the outer sides of the four coils 231 to 234 and maintain them in position.

The annular part 278 is also provided with three identical attachment eyes 288. As FIG. 17 shows, these eyes are provided with through-bores 289 that extend all the way to corresponding holes 290 of the return magnetic path member 213, so that it is possible in this manner to mount the motor hanging on a plate or the like disposed above the rotor 211 and extending parallel to it.

Figure 20:
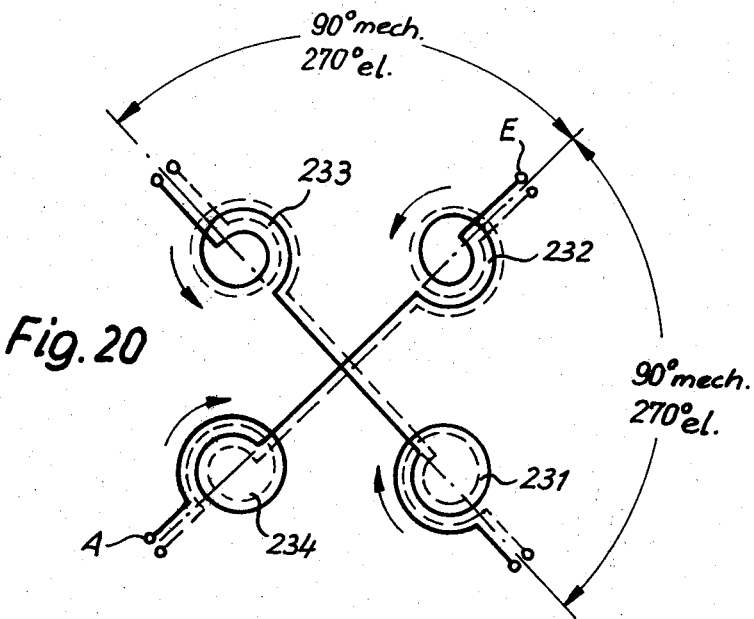
FIG. 20 is a diagram of the four winding wires of the stator of FIG. 16, showing by means of arrows the oppositely directed winding sense of diammetrically opposite coils.

FIG. 18 shows the magnetization of the rotor magnet 277. The magnet has six identically shaped poles, the shape and disposition of which is evident from FIG. 18. The coils 231 to 234 are sector coils, i.e. their magnetically active sections run in each case essentially perpendicular to the axis of rotation of the motor, the turn of the coil being in a plane perpendicular to the axis of rotation. As FIG. 20 shows, in every case, two diametrically opposite coils, namely the pair 231 and 233 and the pair 232 and 234, are connected in series and in each case one member of the pair is wound in the sense or direction opposite to the winding direction of the other, as shown by the arrows in FIG. 20. Since all coils are wound with two wires, preferably in bifilar fashion, there are four winding lengths or phases S1 to S4, that are connected in the manner shown in FIG. 9. It is important here also that as the result of the opposed directions of winding the stray field produced by the stator coils is very low. If between the connection terminals A and E of FIG. 20 a direct current is caused to pass, one coil produces a north pole at the top and the other a south pole. Since these poles mutually compensate each other at some spacing from the coils, a very slight stray field is produced. A further advantage is that the copper filling factor is an optimum for the four pulse motor, an advantage that is provided with the six pole version just described, as well as by another variant to be described below that has ten poles. The disadvantage compared to the eight pole version, as shown in FIGS. 7 and 8, is that the Hall generators 254 and 255 must be disposed above or below coils.

Figure 21:
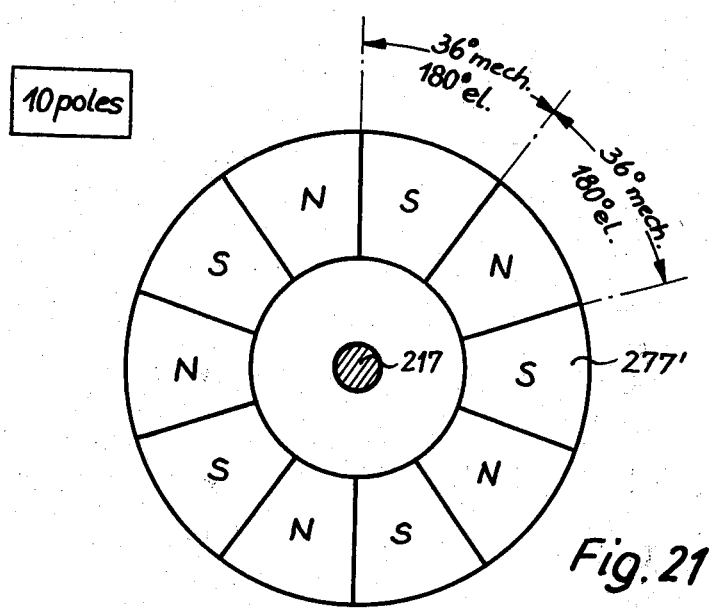
FIG. 21 is a diagram showing the magnetization of the rotor of a ten-pole motor.
Figure 22:
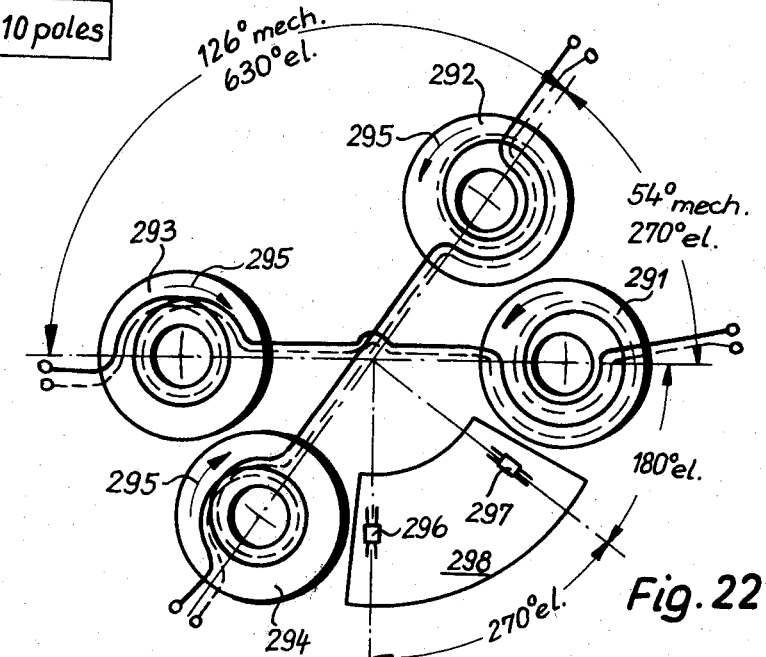
FIG. 22 is a diagram similar to FIG. 20 illustrating the construction and connection of the stator winding for operation with the ten-pole rotor of FIG. 21, as well as the arrangement of the associated Hall generators for rotor position sensing.
Figure 23:
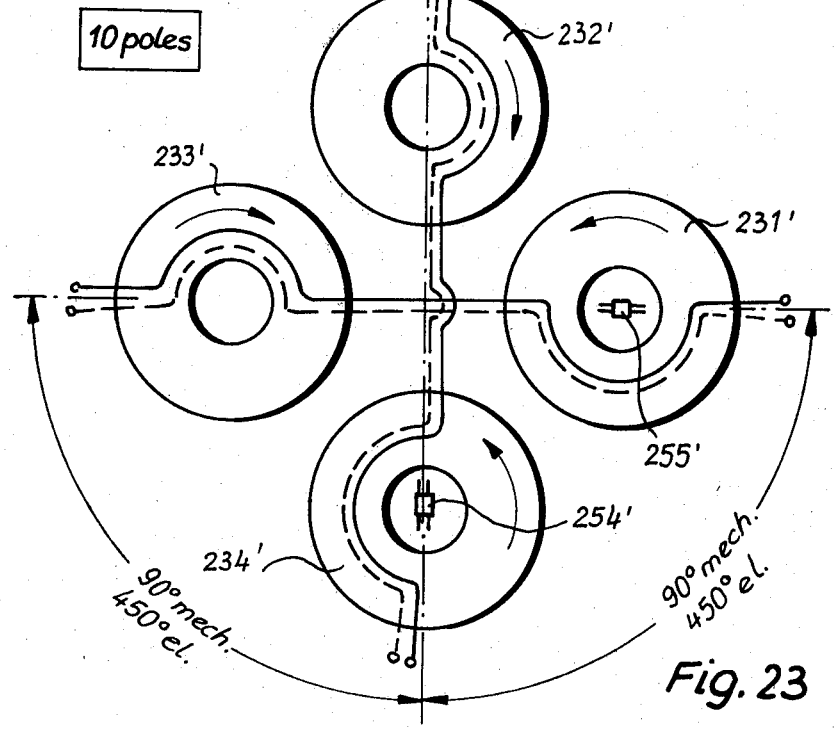
FIG. 23 shows another form of construction of the stator winding for operation with the ten-pole rotor of FIG. 21, also showing the disposition of the associated Hall generators with respect to the stator coils.
Figure 24:
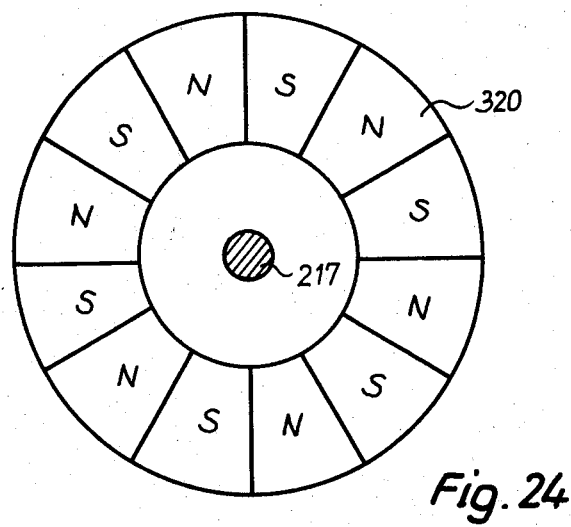
Figure 25:
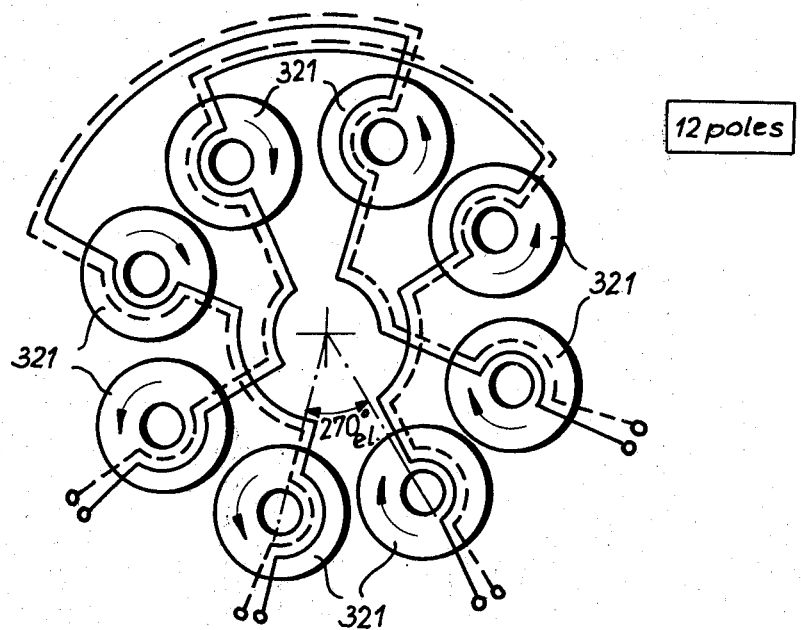
Figure 26:
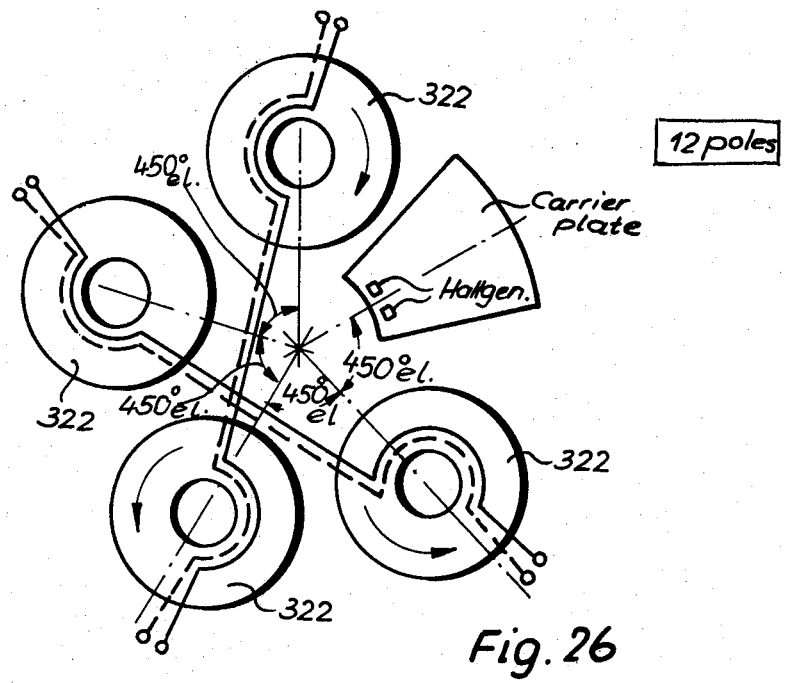
Figure 27:
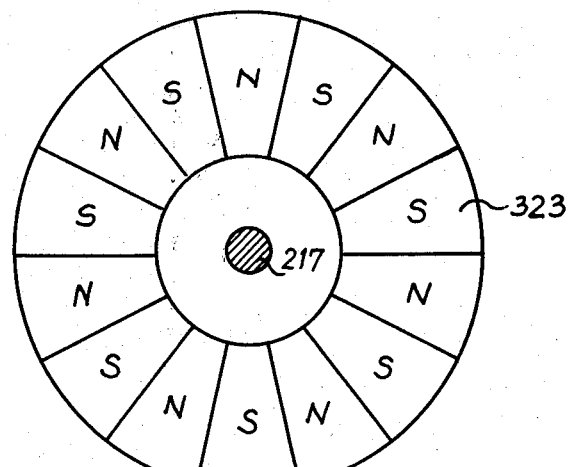
Figure 28:
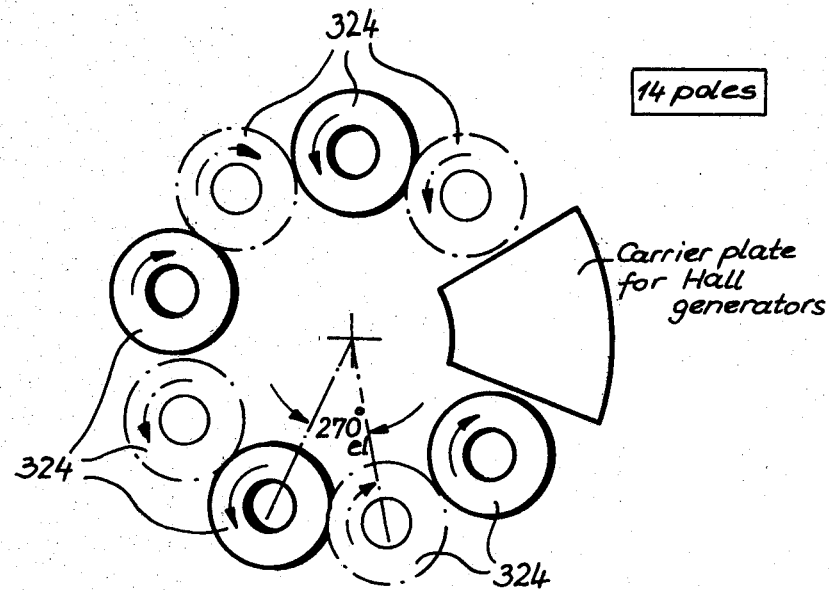

FIGS. 21 to 23 show the application of the principle of oppositely polarized coils to a ten pole motor of which the mechanical construction can correspond essentially to that of FIGS. 15 and 16. FIGS. 21 shows a ten pole rotor magnet 277' with ten identical poles of alternating polarity. FIG. 22 shows one of two possible coil arrangements according to the invention, having four coils 291 to 294 that have the above-specified electrical angular spacing from each other, thus for example either (180°+90°) electrical or (3·180°+90°) electrical. Here also in each case two diametrically opposite coils are polarized oppositely and are connected in series, as is made clear by the arrows 295. Naturally, a parallel connection would also be possible if the coil resistances should be identical (or should be balanced by trimming means). The two Hall generators 296 and 297 are disposed on a circuit board 298 that can be fashioned in a manner similar to the circuit board 251 of FIG. 15. The various mechanical and electrical angles are given in FIG. 22.

FIG. 23 shows a modified coil arrangement for operation with the ten-pole rotor of FIG. 21. This modification is substantially identical with FIGS. 15 and 16. The motor of FIGS. 15 and 16 can also be operated with a ten-pole rotor 277'.

Here, too,—as in FIG. 22—sector coils are to be preferred such as shown in FIG. 16, since these provide a more favorable form of the torque provided by the motor. This is also true for the embodiments of FIGS. 24 to 28.—Because of the correspondence with FIG. 16, the coils and Hall generators of FIG. 23 are designated with the same reference numerals as in FIG. 16, but with a prime added to each reference numeral. Here, too, diametrically opposite coils are oppositely polarized and connected in series, and as in FIGS. 20 to 22, the coils are wound with two wires, so that here, too, four conductors or phases S1 to S4 are provided which can be operated in the circuit of FIG. 9, with the Hall generators 76 and 77 of FIG. 9 replaced either by the Hallgenerators 254 and 255, the Hall generators 296 and 297, or the Hall generators 254' and 255'.

The principle of oppositely polarized coils of diametrical or otherwise interleaved pairs according to the invention can also be applied to motors with larger numbers of poles. For a twelve-pole rotor 320 (FIG. 24), eight coils 321 (FIG. 25) can be provided, with an electrical spacing of (180+90)° between each two adjacent coils, or only four (larger) coils 322 (FIG. 26) can be used, one spaced from the next by an angle of (2×180+90)° el. For a rotor 323 having fourteen poles (FIG. 27), an arrangement is possible that conforms spatially with FIG. 20, i.e. with a coil spacing of 90° mechanical between adjacent coil centers. Alternatively, it is also possible in that case to use eight smaller individual coils 324 (FIG. 28) that then succeed each other with identical spacing angles of 270° el. The coils of one set are shown with full lines, those of the other set or complement with dash-dotted lines. The electrical connection of the eight coils 324 is identical with that of the coils in FIG. 25 and is therefore not repeated.

In each of the embodiments described with reference to FIGS. 16 to 28, the stator winding produces only a relatively small magnetic stray field, which is of particular importance when a tachogenerator is used, in order to obtain a truly first-class speed control of the motor.

In each case, there are thus provided two sets or complements of connected coils, and the coils of each set of the configuration have a mutual angular spacing of ((2n+1)×180)° electrical, so that e.g. for a six-pole motor n equals one, cf. FIG. 20, as is also the case for the eight-pole motor, cf. FIG. 7, whereas for the ten-pole motor n=2 (see FIG. 23) or n=1; 3 (see FIG. 22).

It will be understood that the motor of the present invention can in a similar way be equipped with another kind of tachogenerator, e.g. a tachogenerator operating optically. Similarly, other modifications and variations may be made within the scope of the inventive concept.

The expressions "degrees electrical" and "electrical degrees" are common expressions of this art, cf. Mc-Graw-Hill Encyclopedia of Science and Technology, 1966, Vol. 4, p. 453. In a motor having 2 p rotor poles, one has electrical degrees = p × mechanical degrees.

We claim:

1. Brushless d.c. motor comprising a multipolar permanent magnet rotor having at least 6 poles, stator means comprising a plurality of ironless coils arranged in a one layer winding arrangement, said coils being connected to form a plurality of phase windings (122, S1-S4), rotor position sensing means (76,77; 254,255; 254',255'; 296,297) for controlling the currents in said phase windings so as to obtain four current pulses per rotor rotation angle of 360 electrical degrees and to create in operation a rotary magnetic field driving said permanent magnet rotor, said winding arrangement comprising two sets of coils, each set comprising at least one pair of coils electrically connected with each other and oppositely poled with respect to each other and spaced from each other by (2n+1)·180 electrical degrees between centers, where n is a low positive integer.

2. Brushless d.c. motor as defined in claim 1, in which each said coil has a center-to center spacing of (180m+90) electrical degrees, where m is a low positive integer.

3. Brushless d.c. motor as defined in claim 1 in which said winding arrangement comprises at least one set of four coils, of which the first coil has a center spacing of 270 electrical degrees from the second coil, the second coil has a center spacing of 270 electrical degrees from the third coil, and the third coil has a center spacing of 270 electrical degrees from the fourth coil.

4. Brushless d.c. motor as defined in claim 1, in which each said coil has a center-to-center spacing of 450 electrical degrees from the coils on either side of it in sequence.

5. Brushless d.c. motor as defined in claim 1 in which said rotor has six poles and in which said stator means winding arrangement comprises four coils placed around the motor periphery with 90° mechanical angular spacing.

6. Brushless d.c. motor as defined in claim 1 in which the number of poles of said rotor is a multiple of 8, and in which said stator means comprises four coils, of which the center of the first is spaced 270 electrical degrees from the center of the second, which is in turn spaced 270 electrical degrees from the center of the third, which is in turn spaced 270 electrical degrees from the center of the fourth, and in which said sensors are located between said first and fourth coils, respectively at 180 and at 90 electrical degrees from the center of the first of said coils.

7. Brushless d.c. motor as defined in claim 1 in which said rotor has 10 poles.

8. Brushless d.c. motor as defined in claim 7 in which said stator means has four coils of which the first is spaced 270 electrical degrees from the second and the second 630 electrical degrees from the third, and the thrid 270 electrical degrees from the fourth.

9. Brushless d.c. motor as defined in claim 7 in which said stator means have four coils equally spaced around the rotor shaft at a spacing in succession of 450 electrical degrees.

10. Brushless d.c. motor as defined in claim 1 in which said rotor has 12 poles.

11. Brushless d.c. motor as defined in claim 10 in which said stator means have eight coils with an electrical spacing between centers from one to the next of 270 electrical degrees.

12. Brushless d.c. motor as defined in claim 10 in which said stator means have four coils equally sapced around the rotor shaft with an electrical spacing from one to the next of 450 electrical degrees.

13. Brushless d.c. motor as defined in claim 1 in which said rotor has 14 poles.

14. Brushless d.c. motor as defined in claim 13 in which said stator means has 8 coils.

15. Brushless d.c. motor as defined in claim 13 in which said stator means has 4 coils.

16. Brushless d.c. motor comprising a multipolar permanent magnet rotor, stator means having a plurality of ironless coils arranged in a one-layer winding arrangement, said coils being connected to form a plurality of phase windings (122, S1-S4), rotor positions sensing means (76,77; 254,255; 254',255'; 296,297) for controlling the currents in said phase windings so as to obtain four current pulses per rotor rotation angle of 360 electrical degrees and to create in operation a rotary magnetic field driving said permanent magnet rotor, said winding arrangement comprising at least one set of four coils, of which the first coil has a center distance of 270 electrical degrees from the second coil, the second coil has a center distance of 270 electrical degrees from the third coil, and the third coil has a center distance of 270 electrical degrees from the fourth coil, the first coil being electrically connected with the third coil and oppositely poled with respect to it, and the second coil being electrically connected with the fourth coil and being oppositely poled with respect to it.

17. Brushless d.c. motor as defined in claim 1 or 16 in which said motor has a flat airgap, said winding is a flat one-layer winding extending into said airgap, and a tachogenerator arranged to be driven by said rotor is provided in the vicinity of said motor and comprises at least one measuring coil disposed for having voltages induced therein during operation of said motor.

18. Brushless d.c. motor as defined in claim 17, in which said tachogenerator (34) has a measuring coil (42) and also a second coil (43) substantially identical with said measuring coil (42) connected in a series opposing relation with said measuring coil and in which said second coil (43) is not linked with the useful flux passing through the measuring coil.

19. Brushless d.c. motor as defined in claim 17, in which magnetic shielding of sheet metal (33) is provided between the motor portion and the tachogenerator (34).

20. Brushless d.c. motor as defined in claim 17, in which the coils (59) of the stator winding are in each case adhesively bonded by an adhesive (125) to the stator casing (12) by their respective outer sides.

21. Brushless d.c. motor as defined in claim 1 or 16 in which the width of said individual coils is substantially greater than 180 electrical degrees.

22. Brushless d.c. motor as defined in claim 10, in whihc there is provided in a sector between two stator coils (57,60) a carrier member (75) extending into the airgap of the rotor (20), on which carrier member at least one rotor position sensor (76,77) is mounted.

23. Brushless d.c. motor as defined in claim 1 or 16 in which the coils are wound as bifilar coils, the two wires of the coils of a set being connected to form two phase windings per set.

24. Brushless d.c. motor having a substantially disk-shaped permanent magnet rotor mounted on a shaft, a flat air gap and an iron-free stator winding arrangement comprising four individual coils affixed to the motor casing at their radially outer portions so that said coils extend self-supportedly into said air gap, of which coils the first has a center-to-center spacing of 270 electrical degrees from the second, the second likewise from the third, and the third likewise from the fourth, said rotor comprising spacing means (93) located radially inward of said stator winding arrangement and between rotor portions extending respectively on both sides of said stator winding arrangement for withstanding magnetically produced axial forces between said rotor portions, said motor casing (12) being substantially shell-shaped and arranged to surround at least part of said rotor, said spacing means (93) surrounding with an interposed clearance a tubular bearing means (13) firmly attached to said motor casing (12) for journalling the shaft (11) of said rotor, said spacing means (93) being mounted so as to rotate with said shaft (11).

25. Brushless d.c. motor as defined in claim 1, 16 or 24, in which a first and the third coils in circumferential sequence form a pair of one set of coils and are serially connected and oppositely wound and likewise the second and fourth coils forming the other set of coils.

26. Brushless d.c. motor as defined in claim 1, 16 or 24, in which each said coil has a center-to-center spacing of 270 electrical degrees from the coils on either side of it in sequence.

27. Low-speed brushless d.c. motor comprising a substantially disk-shaped permanent magnet rotor mounted on a shaft, magnetic return path means substantially parallel to the disk plane of said rotor defining a flat air gap between said rotor and said return path means, an iron-free stator winding predominantly located in said air gap and a tachogenerator coaxial with said shaft on the opposite side of said return path means from said rotor, said tachogenerator comprising a speed measuring coil (42) through which said shaft passes coaxially thereto, means for causing a magnetic flux varying at a rate dependent on the speed of the motor to be linked through said speed measuring coil for inducing an alternating voltage therein of a frequency dependent upon motor speed and a compensation coil (43) coaxial with said shaft and with said speed measuring coil mounted so as to be substantially uninfluenced by the flux of said magnetic flux which varies at a rate dependent on motor speed and so mounted as to be linked by the same stray flux as is linked through said speed measuring coil, said compensation coil being connected so as to superpose its output on the output of said speed measuring coil for reducing the effects of stray flux on the combined output.

28. Brushless d.c. motor as defined in claim 27 in which said speed measuring and compensation coils are connected together in series in bucking relation with respect to voltages induced by said stray flux.

29. Brushless d.c. motor as defined in claim 28 in which said speed measuring and compensation coils are of substantially identical construction.

30. Brushless d.c. motor as defined in claim 27, 28 or 29 in which said measuring and compensation coils are flat coils of a thickness much smaller than their radius and are located with a flat surface of one near a flat surface of the other.

31. Brushless d.c. motor as defined in claim 30 in which said measuring and compensation coils are on opposite sides of a stationary member (35) forming a portion of the magnetic path of said tachogenerator.

* * * * *

UNITED STATES PATENT AND TRADEMARK OFFICE
CERTIFICATE OF CORRECTION

PATENT NO. : 4,394,594

DATED : July 19, 1983

INVENTOR(S) : Schmider et al

It is certified that error appears in the above-identified patent and that said Letters Patent is hereby corrected as shown below:

Title page, left column, under item "[30] Foreign Application Priority Data", insert:

--July 24, 1975 [DE] Fed. Rep. of Germany.....2533187--.

Signed and Sealed this

Thirtieth Day of June, 1992

Attest:

DOUGLAS B. COMER

*Attesting Officer*     *Acting Commissioner of Patents and Trademarks*